(12) United States Patent
Boulos et al.

(10) Patent No.: US 7,501,599 B2
(45) Date of Patent: Mar. 10, 2009

(54) APPARATUS FOR PLASMA SYNTHESIS OF METAL OXIDE NANOPOWDER

(75) Inventors: Maher I. Boulos, Sherbrooke (CA); Jerzy W. Jurewicz, Sherbrooke (CA); Christine A. Abdel Messih Nessim, Sherbrooke (CA)

(73) Assignee: Tekna Plasma Systems, Inc., Sherbrooke, Quebec (CA)

( * ) Notice: Subject to any disclaimer, the term of this patent is extended or adjusted under 35 U.S.C. 154(b) by 136 days.

(21) Appl. No.: 11/089,961

(22) Filed: Mar. 25, 2005

(65) Prior Publication Data

US 2005/0217421 A1 Oct. 6, 2005

Related U.S. Application Data

(60) Division of application No. 10/313,506, filed on Dec. 6, 2002, now Pat. No. 6,994,837, which is a continuation-in-part of application No. 09/840,854, filed on Apr. 24, 2001, now abandoned.

(51) Int. Cl.
*B23K 10/00* (2006.01)
(52) U.S. Cl. .............. 219/121.36; 219/121.48; 219/121.51; 315/111.51
(58) Field of Classification Search ............ 219/121.52, 219/121.59, 121.36, 121.54, 121.51, 121.48, 219/75, 121.37; 315/111.51
See application file for complete search history.

(56) References Cited

U.S. PATENT DOCUMENTS

| | | | |
|---|---|---|---|
| 3,449,072 A | 6/1969 | Freeman | 23/142 |
| 3,642,442 A | 2/1972 | Hoekje et al. | 23/202 V |
| 3,650,694 A * | 3/1972 | Allen | 423/613 |
| 3,663,283 A | 5/1972 | Hebert et al. | 106/288 |
| 3,727,378 A | 4/1973 | Zimgibl et al. | 55/72 |
| 4,164,553 A * | 8/1979 | Perugini et al. | 423/440 |
| 4,891,339 A * | 1/1990 | Calcote et al. | 501/87 |

(Continued)

FOREIGN PATENT DOCUMENTS

CN 1245144 A 2/2000

(Continued)

OTHER PUBLICATIONS

Abstract for JP5221615.

(Continued)

*Primary Examiner*—Mark H Paschall
(74) *Attorney, Agent, or Firm*—Fulbright & Jaworski, L.L.P.

(57) ABSTRACT

A process and apparatus for the synthesis of metal oxide nanopowder from a metal compound vapour is presented. In particular a process and apparatus for the synthesis of $TiO_2$ nanopowder from $TiCl_4$ is disclosed. The metal compound vapour is reacted with an oxidizing gas in electrically induced RF frequency plasma thus forming a metal oxide vapour. The metal oxide vapour is rapidly cooled using a highly turbulent gas quench zone which quickly halts the particle growth process, yielding a substantial reduction in the size of metal oxide particles formed compared with known processes. The metal compound vapour can also react with a doping agent to create a doped metal oxide nanopowder. Additionally, a process and apparatus for the inline synthesis of a coated metal oxide is disclosed wherein the metal oxide particles are coated with a surface agent after being cooled in a highly turbulent gas quench zone.

10 Claims, 12 Drawing Sheets

U.S. PATENT DOCUMENTS

| | | | |
|---|---|---|---|
| 5,295,220 A | 3/1994 | Heming et al. | 385/142 |
| 5,498,446 A * | 3/1996 | Axelbaum et al. | 427/212 |
| 5,514,350 A | 5/1996 | Kear et al. | 422/198 |
| 5,728,205 A | 3/1998 | Allen et al. | 106/437 |
| 5,749,937 A | 5/1998 | Detering et al. | 75/10.19 |
| 5,840,112 A | 11/1998 | Morris et al. | 106/442 |
| 5,876,683 A | 3/1999 | Glumac et al. | 423/325 |
| 5,935,293 A * | 8/1999 | Detering et al. | 75/10.19 |
| 5,958,361 A | 9/1999 | Laine et al. | 423/592 |
| 6,110,544 A | 8/2000 | Yang et al. | 427/580 |
| 6,207,131 B1 | 3/2001 | Magyar et al. | 423/613 |
| 6,254,940 B1 | 7/2001 | Pratsinis et al. | 427/562 |
| 2005/0019551 A1 * | 1/2005 | Hunt et al. | 428/323 |

FOREIGN PATENT DOCUMENTS

| | | |
|---|---|---|
| EP | 0776862 A1 | 4/1997 |
| GB | 1085450 | 10/1967 |
| GB | 1088924 | 10/1967 |
| GB | 1092885 | 11/1967 |
| JP | 52221615 A | 8/1993 |
| WO | PCT/CA02/00470 | 10/2002 |

OTHER PUBLICATIONS

Abstract for CN1245144.

Hamblyn et al., "Advances in Inorganic Chemistry and Radio Chemistry", vol. 17, (1975) Academic Press, "Use of Radio-Frequency Plasma in Chemical Synthesis", pp. 89-115.

Dunas, Ph., "Titanium Dioxide Production by Plasma Processing", Chemical Engineering Progress, vol. 66, No. 10, (1970) pp. 66-71.

Rykalin N.N., "Plasma Engineering Metallurgy and Inorganic Materials Technology", Pure & Appl. Chem. vol. 48, pp. 179-194.

Lee, R.F., "Chloride Route Titanium Dioxide Pigments-Process and Properties", Extractive Metallurgy Conference, Perth, (1991) pp. 35-38.

* cited by examiner

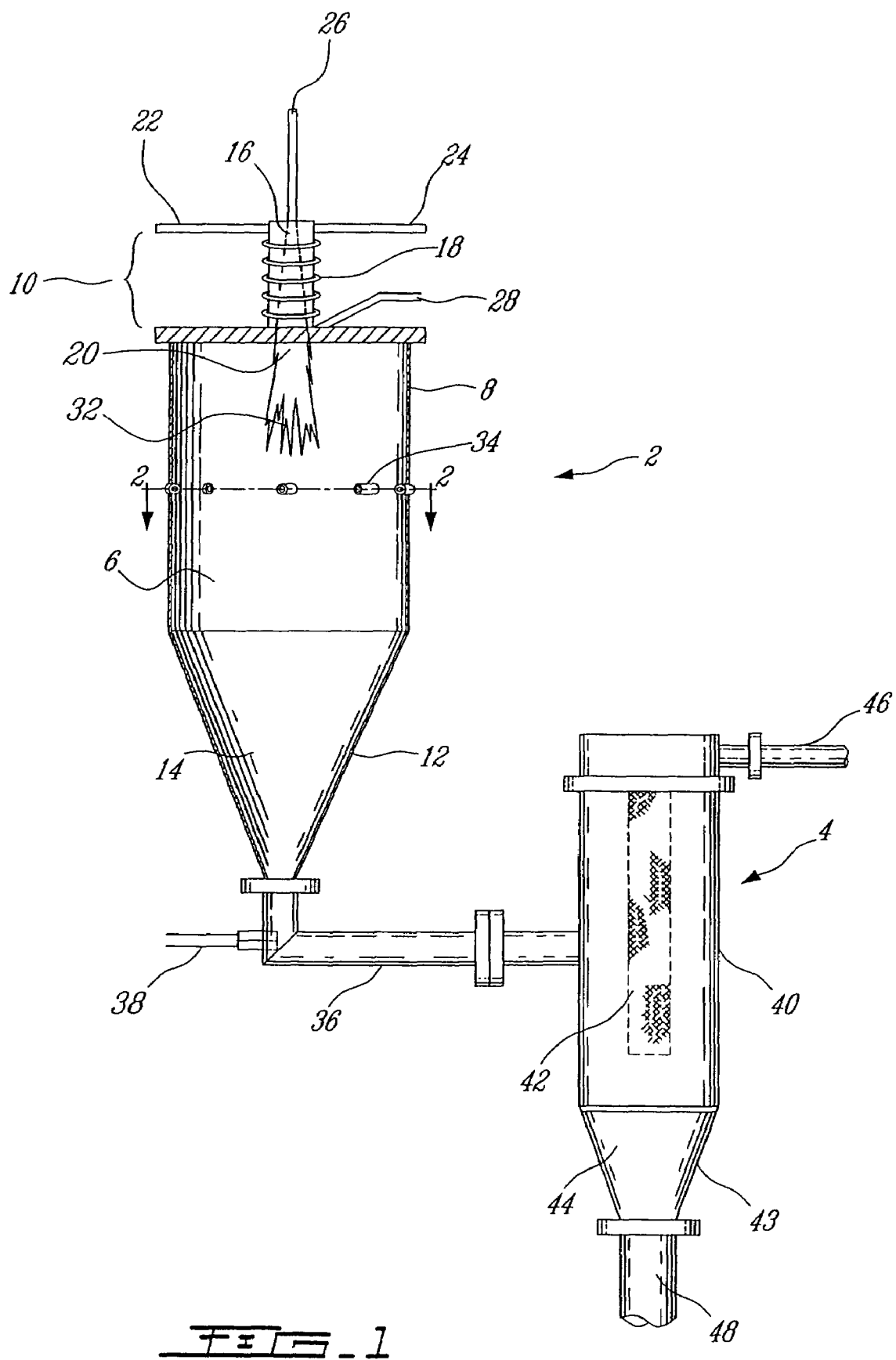
FIG_1

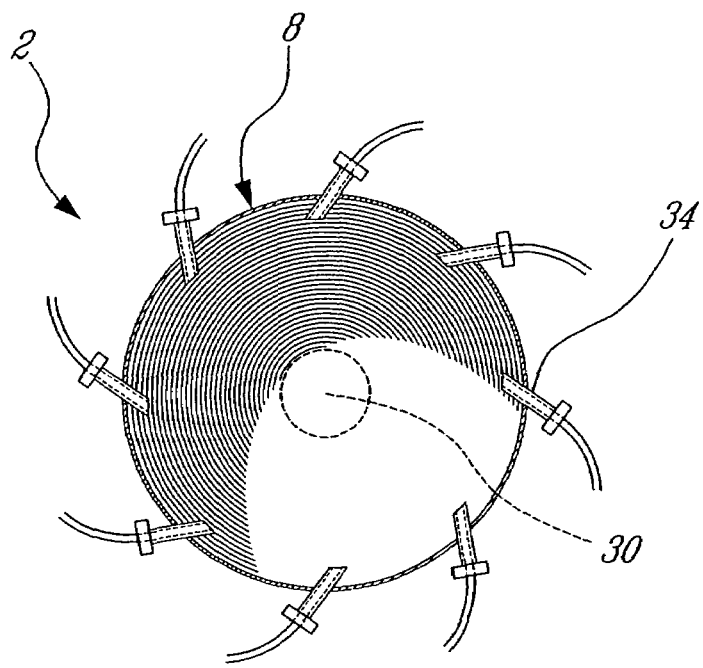
FIG_2
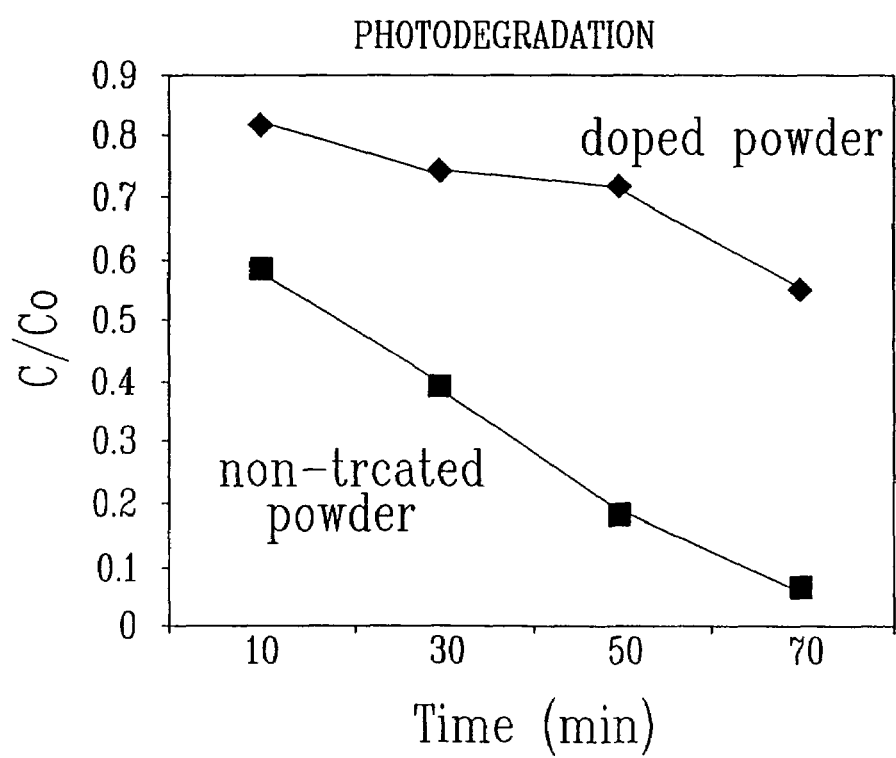
FIG_3

↑ Plasma in     ↑ Plasma in

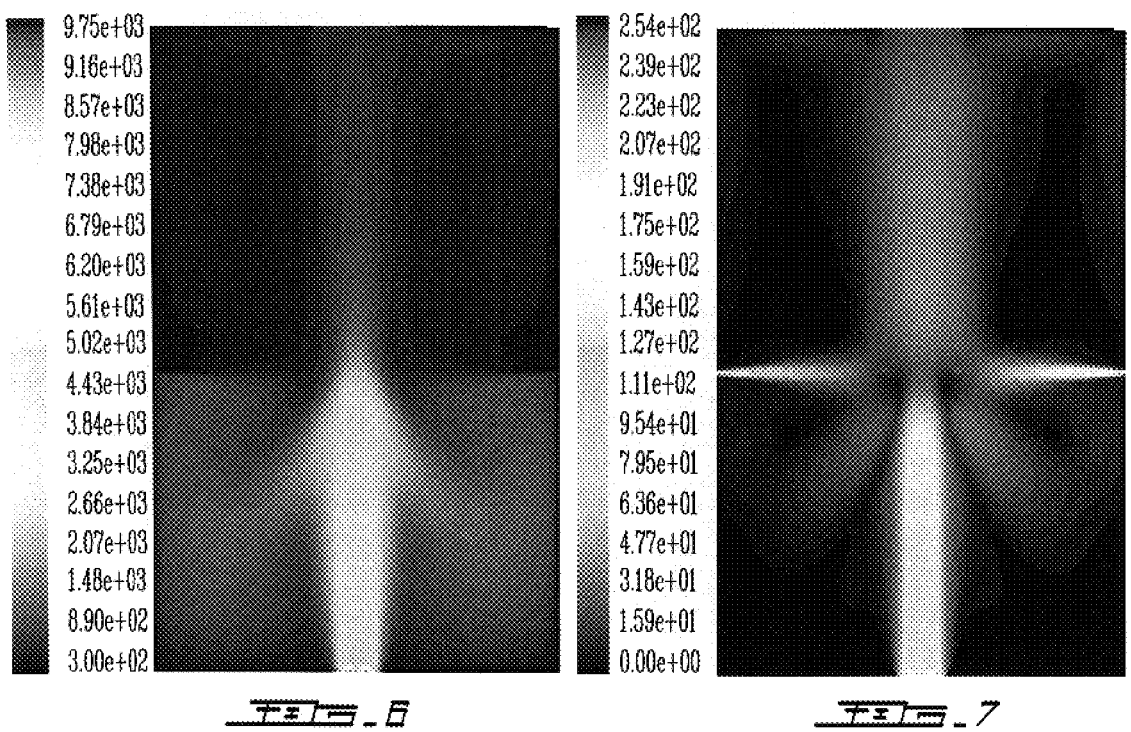

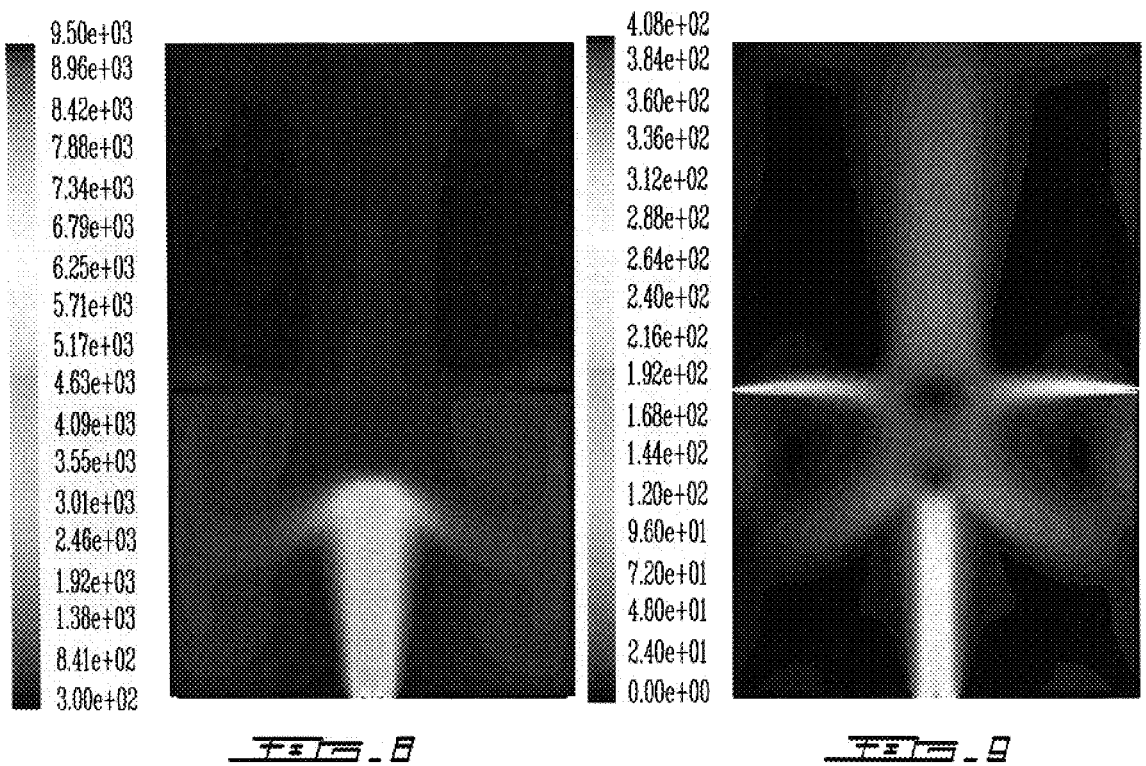

APPARATUS FOR PLASMA SYNTHESIS OF METAL OXIDE NANOPOWDER

CROSS REFERENCE TO RELATED APPLICATION

This application is a divisional patent application of application Ser. No. 10/313,506, filed on Dec. 6, 2002 now U.S. Pat. No. 6,994,837, which is a continuation in part of application Ser. No. 09/840,854, filed Apr. 24, 2001 (now abandoned).

FIELD OF THE INVENTION

The present invention relates to a process and apparatus for the synthesis of metal-containing powders. In particular but not exclusively, the present invention relates to the synthesis of nanosized particles of titanium dioxide by the oxidation of titanium tetrachloride in the vapour phase via induction plasma followed by rapid cooling.

BACKGROUND OF THE INVENTION

Pigments that contribute light-scattering properties to coatings are generally known as white, or hiding, pigments. They act by scattering all wavelengths of light, owing to their relatively high refractive index, so that they are perceived as white to the human eye. The most widely used white pigment is titanium dioxide ($TiO_2$), a polymorphous substance that exists in three modifications or crystal structures, rutile, anatase or brookite. Only the anatase and rutile modifications are of any note, technically or commercially.

The high demand for titanium dioxide based pigments is driven by a combination of a high refractive index and a reasonable manufacturing cost. Additionally, titanium dioxide based pigment does not suffer from the same environmental considerations as earlier white pigments such as Lead carbonate, which had a high toxicity and were readily released into the environment when placed in contact with water.

The anatase phase of titanium dioxide has a lower refractive index and is generally less durable than the rutile form, which makes it less desirable as a coating pigment. However, as will be seen below, both the lower refractive index and lower durability are highly desirable in some applications.

Although the most important use for titanium dioxide is as a pigment, the material is in fact colourless. To reveal its special properties, the titanium dioxide must first be processed to a certain particle size. For example, for pigment applications the particle size would be one half the wavelength of visible light or about 0.3 microns.

Aside from its excellent properties as a pigment, titanium dioxide has dielectric properties, high ultraviolet absorption and high stability which allows it to be used in speciality applications, such as Electro-ceramics, glass and as an insulator.

Titanium dioxide pigments are used in man-made fibres, such as polyester, viscose and rayon to name a few. As man made fibres have an undesirable glossy and translucent appearance, the pigment is incorporated into the fibre during the spinning process either for brightening the fibre or reducing the fibre's lustre. For this application the anatase phase is advantageous since as it has a more neutral white tone than the rutile modification and is also less abrasive. This latter property is very important as the process for spinning fibres is very delicate and would be adversely affected by the addition of the rutile form of titanium dioxide to the fibres. Anatase, on the other hand, is a photo catalyst that is activated by ultraviolet radiation resulting in the rapid degradation of the man made fiber when exposed to sunlight.

Titanium dioxide is also used for adding opacity and brightness to plastics. The opaqueness and high brightness help mask the poor natural colour of many plastics. Additionally, some grades of titanium dioxide absorb ultraviolet light which can accelerate the ageing of plastics.

Additionally, titanium dioxide is added as a filler to the pulp in paper manufacturing processes to enhance brightness and opaqueness. This allows, for example, for the production of highly opaque lightweight papers. For this application titanium dioxide in its anatase phase can be used.

In order to manufacture titanium dioxide, a source of titanium is required. Although titanium ranks ninth in abundance among elements found in the crust of the earth, it is never found in the pure state. Rather, it occurs as an oxide in the minerals ilmenite ($FeTiO_3$), rutile ($TiO_2$) or sphene ($CaO$—$TiO_2$—$SiO_2$).

The production of titanium dioxide pigments is a two step process. The first step is to purify the ore, and is basically a refinement step. This may be achieved by either the sulphate process, which uses sulphuric acid as a liberating agent or the chloride process, which uses chlorine as the liberating agent.

In the sulphate process, the titanium containing ore is dissolved in sulphuric acid, yielding a solution of titanium, iron, and other metal sulphates. Through a series of steps including chemical reduction, purification, precipitation, washing, and calcination, pigment size $TiO_2$ is produced.

Alternatively, the chloride process includes high-temperature, anhydrous vapour phase reactions. Titanium ore is reacted with chlorine gas under reducing conditions to obtain titanium tetrachloride ($TiCl_4$) and metallic chloride impurities, which are subsequently removed. Highly purified $TiCl_4$ is then oxidized at high temperature to produce intermediate $TiO_2$. The oxidation step in the chloride process permits control of particle size distribution and crystal type, making it possible to produce high quality pigment grade $TiO_2$.

The chloride process is inherently cleaner than the sulphate process and requires a smaller investment on behalf of the manufacturer in terms of waste treatment facilities. Additionally, titanium dioxide produced using the chlorine process is generally of higher purity, more durable and has a particle size distribution which is narrower, the latter improving brightness, gloss and opacity.

As stated above, the chloride process includes high-temperature anhydrous vapour phase reactions where liquid titanium tetrachloride is vaporised and superheated after which it is reacted with hot oxygen to produce titanium dioxide. The superheating and subsequent reaction phase can be carried out either by a refractory process, where the reactants are heated by refractory heat exchangers and combined. Alternatively, carbon monoxide can be purified and then mixed with the titanium tetrachloride and oxidizing agent and then the mixture subject to a controlled combustion. Finally, the titanium tetrachloride can be vaporised in a hot plasma flame along with the oxidizing agent. This final method has proven to be the most efficient.

A number of technical approaches are available for generating the plasma. For example, the plasma may be generated by passing the working gas between a pair of electrodes whereby an arc discharge ionizes the gas as it passes between. A drawback of this approach is that the electrode is bound to contaminate the working gas, either by trace chemical reaction between the electrode and the working gas, or by degradation of the electrodes. This drawback is particularly acute when the working gas is an inert, reducing or oxidizing gas.

U.S. Pat. No. 5,935,293, entitled "Fast Quench Reactor Method" issued to Detering et al. on Aug. 10, 1999 described a method for producing ultra-fine solid particles in an electrode-generated plasma reactor. The reactor is configured so as to cause a metal halide reactant stream introduced in the reactor to expand after reaching a predetermined reaction temperature thereby causing rapid cooling thereof. The expansion results from the stream passing through a quench zone where the stream reaches supersonic velocity. The quench zone is intended to prevent back reaction and promote completion of the reaction.

A major drawback of the Detering method, in addition to the above-mentioned contamination problem, is that it does not lend itself for a reactant dilution sufficiently high for the generation of nanopowders, and to avoid powder agglomeration. Indeed, electrode-generated plasma are known to be relatively high-energy and to yield non-uniform temperature in the reactor. Those two conditions prevent the use of important dilution of reactant and render difficult control on the particle size distribution. It is to be noted that the Detering method, when used in the synthesis of $TiO_2$, does not promote the production of its anatase phase.

In other known methods, the working gas may be passed through a high frequency electrostatic field. According to other known methods, the working gas may be passed through a high frequency induction coil whereby the electromagnetic field ionizes the gas as it passes within the coil. It is to be noted that induction plasma torches are characterized by a volume discharge larger than direct current plasma source, and a longer residence time. Indeed, for comparable power rating, an induction plasma torch would operate with more than 100 standard liters per minute of plasma gas, compared with 20-30 standard liters per minute of plasma gas with electrode-generated plasma reactor.

The synthesis of pigment grade titanium dioxide through the oxidation of titanium tetrachloride in a plasma flame formed by passing a working gas through a high frequency induction coil is well known in the art and has been used industrially for some time for the commercial production of such powders for the paint industry.

Traditionally, the product obtained in this case is composed of relatively large opaque particles with a particle size in the range of 0.2 to 2.0 micrometers or more. Such powders are used as a base material for the production of a wide range of paints and surface modification coatings.

There has always been an interest in obtaining finer powders in the nanometer range for a wide variety of other applications including ultraviolet protection and the sunscreen industry as well as for advanced catalyst development. However, the development of a process to produce large quantities of titanium dioxide nanopowders has proved difficult to attain. The main obstacle has been the method to achieve such an important reduction in the size of distribution of the powder and control its chemistry and surface properties.

SUMMARY OF THE INVENTION

The present invention addresses the above limitations by providing an improved process for the production of metal oxide nanopowders.

More specifically, in accordance with a first aspect of the present invention, there is provided a process for the synthesis of a metal oxide nanopowder from a metal compound vapour. This process comprises the steps of bringing the metal compound vapour to a reaction temperature, reacting the metal compound vapour at the reaction temperature with an oxidizing gas to produce a metal oxide vapour, producing a highly turbulent gas quench zone, and producing the metal oxide nanopowder by cooling the metal oxide vapour in the quench zone.

Accordingly, the process of the invention enables the production of a metal oxide nanopowder with a controlled particle size distribution and surface reactivity.

Also in accordance with the present invention, there is provided a process for the synthesis of a metal oxide nanopowder from a metal compound vapour, comprising:

generating an induction plasma jet by passing a working gas through a high frequency electromagnetic field;

introducing the metal compound vapour and the induction plasma jet through a first axial end of a reactor; the plasma jet causing the metal compound vapour to reach a reaction temperature and to react with the working gas, yielding nanosized metal oxide particles;

rapidly cooling the nanosized metal oxide particles in a quench zone of said reactor located downstream from the first axial end, thereby stopping the growth process of the nanosized metal oxide particles, yielding metal oxide nanopowder; and collecting the metal oxide nanopowder downstream from the quench zone;

whereby, the combination of a) reacting the metal oxide compound with the induction plasma; induction plasma allowing for sufficiently large volume discharge and sufficiently long residence time in the reactor, and b) rapidly cooling the yielded nanosized particles in a quench zone, allows to control the metal oxide particles sizes.

Additionally, in accordance with another embodiment, a doping agent may be mixed with the metal chloride prior to injecting said metal chloride in the plasma.

In accordance with still another embodiment, the step of reacting the metal chloride vapour with an working gas may further comprise injecting a doping agent into the plasma after the metal chloride has reacted with the oxidizing gas.

In accordance with yet another embodiment, the metal oxide nanopowder may be coated with a doping agent.

In accordance with a second aspect of the present invention, there is provided an apparatus for synthesising a metal oxide nanopowder from a metal compound vapour. The apparatus comprises the following elements:

a reaction chamber including a vertically disposed generally tubular chamber section and a taper chamber section mounted at a lower end of the vertically disposed generally tubular chamber section for collecting synthesized metal oxide nanopowder;

an induction plasma assembly including a reactant mixing chamber mounted to an upper end of the vertically disposed generally tubular chamber section so as to be in fluid communication with the reaction chamber; the induction plasma assembly further including an inductive coil surrounding the reactant mixing chamber for generating a high frequency magnetic field in the reactant mixing chamber, a first inlet for receiving a first working gas and a second inlet for receiving the metal compound vapour; the first and second inlet being connected to the generally tubular reactant mixing chamber; and a plurality of substantially coplanar quench gas nozzles connected to the periphery of the vertically disposed generally tubular chamber section below the upper end thereof for creating a quench zone in the reaction chamber;

whereby, in operation, an induction plasma jet is created by passing a working gas through the high frequency electromagnetic field in the reactant mixing chamber; the induction plasma jet and the metal compound vapour being introduced in the reaction chamber; the plasma jet causing the metal compound vapour to reach a reaction temperature and to react with the working gas, yielding nanosized metal oxide particles; the nanosized metal oxide particles being rapidly cooled in the quench zone of the reactor, thereby stopping the growth process of the nanosized metal oxide particles, yielding metal oxide nanopowder.

The foregoing and other objects, advantages and features of the present invention will become more apparent upon reading of the following non-restrictive description of an illustrative embodiment thereof, given by way of example only with reference to the accompanying drawings.

BRIEF DESCRIPTION OF THE DRAWINGS

In the appended drawings:

FIG. 1 is a schematic elevation view of an apparatus in accordance with the present invention, for the production of a metal oxide nanopowder;

FIG. 2 is a cross sectional view, taken along line 2-2 of FIG. 1, of the apparatus in accordance with the present invention, for the production of a metal oxide nanopowder;

FIG. 3 is a graph illustrating the photocatalytic degradation of phenol in water in the presence of doped and non treated $TiO_2$ nanopowder;

FIG. 6 is a graph illustrating temperature iso-contours in the reactor of FIG. 1 for a gas flow rate in the quench zone of 225 slpm;

FIG. 7 is a graph illustrating velocity iso-contours in the reactor of FIG. 1 for a gas flow rate in the quench zone of 225 slpm;

FIG. 8 is a graph illustrating temperature iso-contours in the reactor of FIG. 1 for a gas flow rate in the quench zone of 375 slpm;

FIG. 9 is a graph illustrating velocity iso-contours in the reactor of FIG. 1 for a gas flow rate in the quench zone of 375 slpm;

DETAILED DESCRIPTION OF THE ILLUSTRATIVE EMBODIMENT

Figure 4:
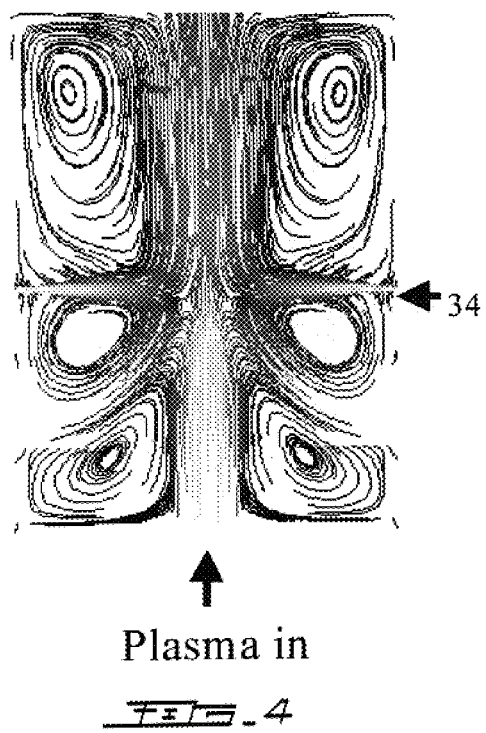
FIG. 4 is a stream line graph illustrating turbulence in the reactor of FIG. 1 for a gas flow rate in the quench zone of 225 slpm.

According to an illustrative embodiment of the present invention, titanium dioxide nanopowder is manufactured by heating titanium tetrachloride to a reaction temperature using an induction plasma, reacting the obtained titanium tetrachloride vapour with an oxidizing gas to form titanium dioxide vapour and rapidly cooling the titanium dioxide vapour to promote homogeneous nucleation of a fine aerosol and stop the growth process of the resulting particles.

Referring now to the drawings, FIG. 1 illustrates a reactor 2 and a filter unit 4. The reactor 2 includes a sealed reaction chamber 6 comprising a vertically disposed generally tubular chamber section 8 closed at the upper end by an induction plasma jet assembly 10. The sealed reaction chamber 6 also comprises a taper chamber section 12 integrally mounted to the vertically disposed generally tubular section 8 at the lower end thereof. This taper chamber section 12 defines a region 14 for receiving titanium dioxide nanopowder or any other resulting metal oxide nanopowder. The pressure in the reaction chamber 6 is generally uniform and ranges from about 400 to 500 Torr.

The plasma jet assembly 10 comprises a generally tubular reactant mixing chamber 16 and an inductive coil 18 coaxial with and surrounding the mixing chamber 16. Of course, the reactant mixing chamber 16 is in fluid communication with the sealed reaction chamber 6. The plasma 20 used to heat the titanium tetrachloride is produced by the plasma jet assembly 10 by passing a gas, referred to in the art as a working gas, through a high frequency electromagnetic field, such as a radio frequency field. This electromagnetic field should have a power level sufficient high to cause, by induction, the gas to ionize and thereby produce and sustain plasma. The working gas could be any gas which will ionize when subject to the high frequency electromagnetic field and which remains inert when in the presence of titanium tetrachloride or any other reactant used. Examples of suitable working gases include helium, argon, carbon monoxide, oxygen, and air or a mixture thereof. By supplying a high frequency electric current to the inductive coil 18 the mixture of gases in the reactant mixing chamber 16 is ionized and plasma created.

In the illustrative embodiment, the working gas is formed of a mixture of oxygen and argon (with oxygen also acting as the oxidizing agent). Oxygen is introduced into the reactant mixing chamber 16 via a first inlet 22 and argon via a second inlet 24. A high frequency electric current is applied to the inductive coil 18; the power level of this electric current is sufficiently high to ionize the oxygen/argon mixture and create the plasma 20. The minimum power level applied to the inductive coil 18 necessary for self sustained induction plasma discharge is determined by the gas, pressure and frequency of the magnetic field. The minimum power necessary for sustaining an induction plasma discharge may be lowered by reducing the pressure or by adding ionising mixtures. Power can vary from 20 to 30 kW all the way up to hundreds of kilowatts depending on the scale of operation. The frequency of the current supplied to the inductor coil 18 can be of the order of 3 MHz, although successful operation can be demonstrated at typical frequencies as low as 200 kHz or as high as 26.7 MHz. It should also be apparent to a person of ordinary skill in the art that frequencies outside the range of 200 kHz to 26.7 MHz may be used. In the illustrative embodiment a sinusoidal 30 kW electrical current of 3 MHz is applied to the inductive coil 18 whereby the oxygen/argon mixture in the reactant mixing chamber 16 is ionized to create the induction plasma 20.

Titanium tetrachloride is introduced axially into the reactant mixing chamber 16 via a third inlet 26. In an alternative illustrative embodiment the titanium tetrachloride is introduced radially into the plasma 20 immediately below the reactant mixing chamber 16 via a fourth inlet 28. In a second alternative illustrative embodiment a combination of axial introduction of titanium tetrachloride via the third inlet 26 and radial introduction of titanium tetrachloride via the fourth inlet 28 is used.

Additionally, a doping agent can react with the oxidizing gas to modify the bulk and/or surface properties of the nanopowders produced. In a first alternative illustrative embodiment the doping agent is mixed with the titanium tetrachloride prior to the titanium tetrachloride being brought to the reaction temperature by the plasma 20. Bringing the mixture to reaction temperature causes both the titanium tetrachloride and the doping agent to simultaneously under go oxidization thus modifying the bulk properties of the titanium dioxide formed, its surface properties, or both.

In a second alternative illustrative embodiment, the doping agent is injected into the plasma 20 after the titanium tetrachloride has reacted with the oxidizing gas and the titanium dioxide formed. Similar to the first alternative illustrative embodiment described above, provided the doping agent is vaporised at the reaction temperature, the doping agent will react with the oxidizing gas, modifying the bulk properties of the titanium dioxide, its surface properties, or both.

Doping agents introduced into the process at this stage may include volatile metal compounds, such as Silicon Tetrachloride and Zinc Chloride.

It should be noted that once the plasma 20 has been established it may be sustained solely by the flow of titanium tetrachloride. Indeed, the plasma 20 may be initiated and established by the flow of titanium tetrachloride alone. Also, by mixing a readily ionized working gas such as argon with the titanium tetrachloride, ignition of the plasma is greatly simplified.

As the titanium tetrachloride comes into contact with the plasma 20 it vapourises and the oxidation reaction proceeds almost instantaneously giving rise to the formation of titanium dioxide and free chlorine. The reaction is estimated as taking place at a temperature between 1500° C. and 3000° C. although it should be apparent to one of ordinary skill in the art that lower or higher temperatures can also be used depending on plasma loading and input power to the inductor coil 18.

The process involves a high intensity turbulent quench technique which has been developed for the ultra rapid cooling of the products of the reaction and the hindrance of the particle growth process normally associated with the formation of aerosol particles through vapour condensation. The rapid quench technique contributes to the formation of the nanopowder and the predominance (experimental results reveal over 80%) of the anatase phase in this powder. The quench technique aims to bring the temperature of the titanium dioxide vapours down from the reaction temperature of between 1500° C. to 3000° C. to a temperature in the range of 100° C. and 500° C. Experimental tests carried out using an apparatus in accordance with the illustrative embodiment yielded cooled temperatures of approximately 120° C.

Referring now to FIG. 2 in addition to FIG. 1, a highly turbulent gas quench zone 30 is produced by injecting an intense turbulent stream of compressed quench gas into the plasma discharge 32. This is made via coplanar fine quench gas nozzles such as 34 oriented in respective directions having both radial and tangential components to produce respective high speed jets of quench gas in the same radial/tangential direction.

In turbulent flow, as it is well known to a person skilled in the art, the level of turbulence is measured in terms of the intensity of turbulence of the flow which is defined as the ratio of the root mean square (rms) of the fluctuating fluid velocity to the time mean fluid velocity. In laminar flows the turbulence intensity is zero, since the local fluid velocity is stable and does not change with time. In turbulent flows, the intensity of turbulence depends on the nature of the flow. For example, in turbulent pipe flows, the intensity of turbulence is in the 5 to 7% range while in free and confined jet, and in turbulent shear flows, the turbulence intensity can be in the 10 to 20% range or higher. In the context of the present invention, the term "high turbulent flow" refers to the use of internal jets and shear flows in the quench zone with turbulence intensities in the 10 to 20% range or higher.

As better shown in FIG. 2, the nozzles 34 are equally spaced apart from each other around the periphery of the reactor 2. This results in rapid cooling of the product vapour and the immediate halting of the particle growth process. It has been found that introducing turbulence of at least 20 to 30% in the quench zone promotes the rapid mixing of the quench gas with the reactant products and allows for cooling the reaction products at rates that can be as high as $10^{6°}$ C./s which is sufficiently rapid to stop their growth process.

The combination of the highly turbulent quench zone 30 and of the use of an induction plasma, allowing for a large volume discharge and a long residence time of the reactant in the plasma zone, is largely responsible for the control achieved by this process on the particle size distribution and the nanosized mean particle diameter of the titanium dioxide powder obtained.

The above-described high intensity turbulent quench technique allows controlling the flow pattern in the quench zone 30 through the use of an array of high velocity jets directed at an angle with the normal to the periphery of the reaction chamber 8 (see FIG. 2), towards the center of the reactor at the quench level. The localized pinch effect thus produced in the center of the quench zone 30, combined with the high intensity turbulence level and the associated aerosol dilution resulting from the addition of a significant amount of gas into the flow, contributes to control the particle size distribution of the formed nanopowder, reduces chances of its agglomeration and even allows for the control of the crystal structure of the nanopowder obtained.

More specifically, the quench technique used in the illustrative embodiment is comprised of a circular air channel which is located below the plasma discharge 32 in the reactor 2. The location of the quench zone 30, depending on the process requirement, may vary between a few centimeters to about 20 centimeters downstream of the plasma discharge 32. Although air is used as a quench gas in the illustrative embodiment in accordance with the present invention, it should be apparent to one of ordinary skill in the art that selection of the quench gas is dictated to some degree by the chemistry of the process, and that other gases such as for example pure oxygen and nitrogen may also be used as a quench gas.

The quench gas is injected into the reactor 2 with a velocity on the order of several hundred meters per second up to sonic velocity. In the illustrative embodiment the velocity of the injected quench gas is 260 meters per second. The higher the difference between the velocity of the injected gas and the velocity of the injected plasma jet, the higher is the resulted turbulence. As will be demonstrated hereinbelow, the cooling rate increases with the turbulence. The injected quench gas results in the formation of a high intensity turbulent flow zone 30 in the center the vertically disposed generally tubular section 8 of the reaction chamber 6 of the reactor 2 at the level of the quench gas nozzles 34. The formation of this flow zone 30 gives rise to the rapid cooling of the products of the reaction and their condensation in the form of a nanometer sized aerosol particles. The rapid cooling of the products of the reaction also favours the formation of the $TiO_2$ nanopowder in the anatase phase which is the predominant phase formed at high temperature.

The direction of the quench gas nozzles 34 can be adjusted in the plane in which these nozzles 34 are lying in order to control the turbulence characteristics in the center of the quench zone 30 which, in turn, has an influence on the nature of the nanopowders obtained.

A conduit 36 interposed between the reactor 2 and the filter unit 4 is affixed at the lower, smaller-diameter end of the taper section 12 of the reaction chamber 6 of the reactor 2, and is used for transporting the cooled nanopowder to the filter unit 4 for filtering. A fifth inlet 38 is located in the wall of the conduit 36. A suitable doping agent may possibly be introduced through this fifth inlet 38 for coating the cooled nanopowder. By coating the powder, properties of the powder can be modified to adapt them to particular applications. For example, as stated above the process produces $TiO_2$ with a proportionally higher content of the anatase phase. Adding the anatase phase to man made fibres combined with exposure to ultraviolet radiation can lead to auto-degradation of the fibres (due to the catalytic behaviour of the anatase phase when in the presence of ultraviolet radiation). By first coating the powder with the polymer methyl methylacrylate, prior to its addition to man made fibres, the auto degradation can be effectively halted thereby extending the life of the fibres.

Another aspect to be considered in the coating process is the temperature of the powder to be coated. Traditionally, $TiO_2$ powders are left to cool for some time before an additional and separate coating process is applied to modify the surface characteristics of the powder. The rapid cooling of the powder provided by the highly turbulent gas quench technique means that the powder can be coated immediately following quenching with a range of materials which would otherwise be destroyed or negatively effected by the heat of the powder. Additionally, for a number of coatings an accurate control of the cooled temperature is necessary, especially polymers if polymerisation is to take effect. Experiments have revealed, for example, that the coating of a $TiO_2$ powder with the polymer methyl methylacrylate can be carried out at a temperature of 120° C., a temperature which can be readily achieved and controlled through the use of the highly turbulent gas quench technique.

This coating of the nanopowder after cooling by the quench zone is herein referred to as inline doping. Although in this regard reference is made to the coating of a cooled nanopowder, it should be evident to one of ordinary skill in the art that the inline coating process could also be applied to a powder with a particle size larger than a nanopowder.

Depending on the intended use of the nanopowder (or powder, in the case a powder with a particle size greater than a nanopowder is being coated), many surface coating agents may be considered. The surface coating agent controls the surface properties of the nanopowder. For example, as stated above, the use of methyl methylacrylate as surface coating agent resulted in a significant reduction of the catalytic properties of the predominantly anatase $TiO_2$ nanopowder produced. Referring to FIG. 3 the photocatalytic degradation of a normalised concentration phenol in water in the presence of a $TiO_2$ nanopowder doped with methyl methylacrylate ("doped powder") is displayed versus that of a non-treated powder. The process is not limited, however, to one specific surface coating agent. Other potential surface coating agents are known to those of ordinary skill in the art and may include, for example, Teflon monomer, Diethyl Zinc, chloro-fluoro-carbons and metallic vapours.

The filter unit 4 is comprised of an upper, vertically disposed generally tubular section 40. A taper section 43 is mounted on the lower end of the generally tubular section 40 and defines a region 44 for receiving filtered titanium dioxide nanopowder. A porous filter medium 42, such as Goretex™, capable of capturing the nanopowder is mounted axially and centrally within the generally tubular section 40 and has porosity such that the nanopowders cannot pass there through and are removed from the exhaust gases which are expelled via the exhaust 46. Nanopowder received in the region 44 is collected through a bottom vertical conduit 48.

Referring now to FIGS. 4 to 17, the impact of the quench zone 30 on the particles cooling rate will be illustrated.

Experiments and computer simulations have been performed to model the flow, temperature and concentration fields in the reactor quench zone 30 under the following conditions:

plasma torch model PL-35 with a 35 mm internal diameter plasma confinement tube; reactor diameter at the level at which the plasma jet enters the reactor is 260 mm;

axial distance between the level at which the quench gas is introduced into the reactor 2 and the reactor inlet is 160 mm;

quench ring geometry made up of 16 equally spaced, radially oriented, holes each with a diameter of 1.5 mm; and plasma torch operating conditions:

sheath gas=125 slpm (O2);

central gas=30 slpm (Ar);

reactant gas=18.5 slpm (Ar);

quench gas flow rate=225 or 375 slpm (Air);

reactor pressure=425 Torr;

oscillator frequency=3 MHz; and plasma power=28.4 kW.

Results are provided for two quench gas flow rates of 225 slpm (Air) and 375 slpm (Air). These results show the importance of introducing a high level of turbulence in order to achieve the high cooling rate necessary for the formation of nanosized powders.

Figure 5:
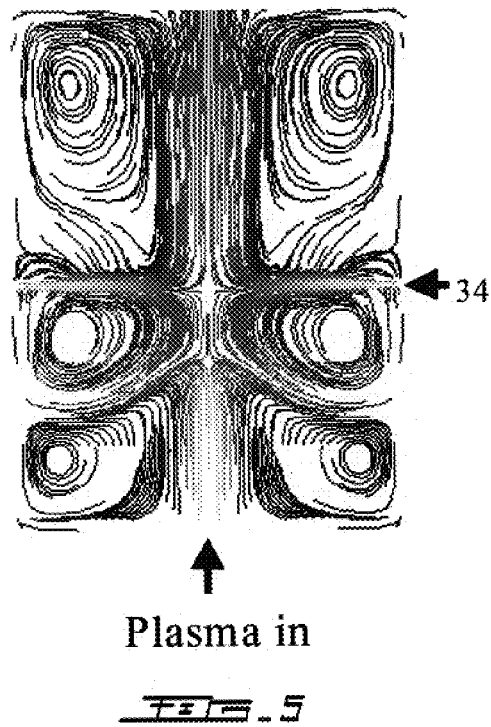
FIG. 5 is a stream line graph illustrating turbulence in the reactor of FIG. 1 for a gas flow rate in the quench zone of 375 slpm.

The respective flow pattern in the reactor 2 for each of these two quench gas flow rates are given in FIG. 4 and FIG. 5. FIG. 4 corresponds to a quench gas flow rate of 225 slpm while FIG. 5 corresponds to the case of a quench gas flow rate of 375 slpm. The significant influence of the quench gas flow rate on the gas recirculation pattern can thus be observed.

The corresponding data for the temperature and velocity fields are shown respectively in FIGS. 6 and 7 for a quench gas flow rate of 225 and on FIGS. 8 and 9 for a quench gas flow rate of 375 slpm (Air).

Figures 10, 11:
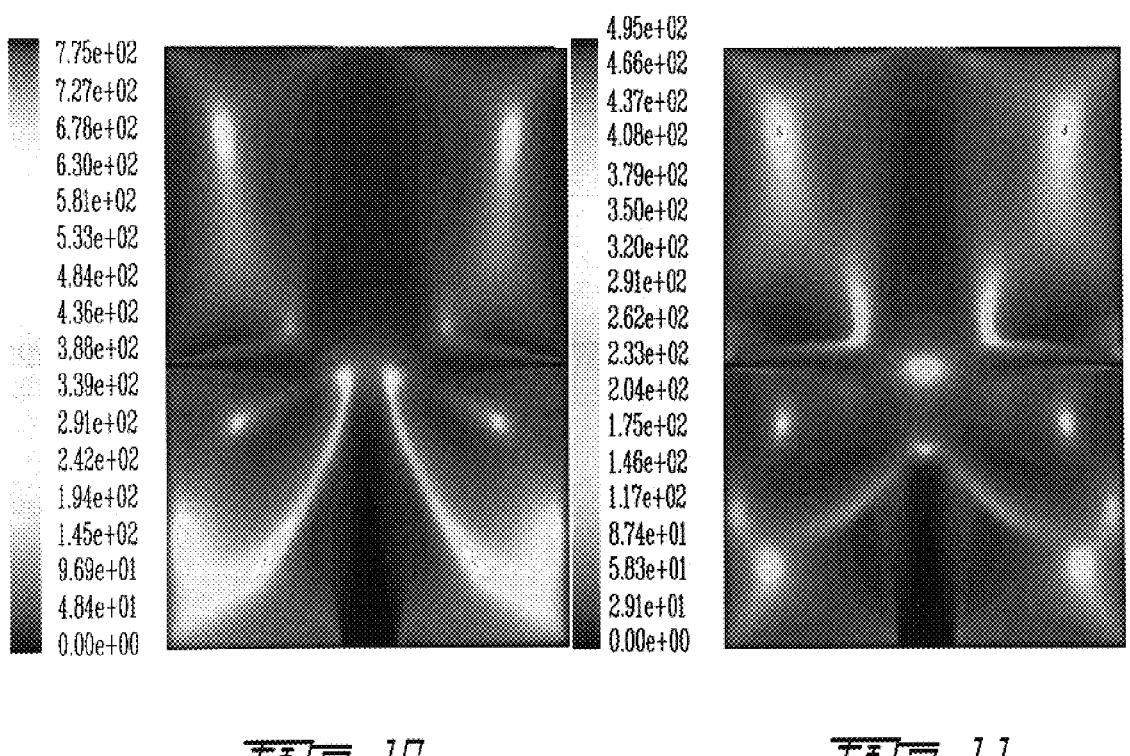
FIG. 10 is a graph illustrating the turbulent intensity iso-contours in the reactor of FIG. 1 for a quench gas flow rate of 225 slpm.
FIG. 11 is a graph illustrating the turbulent intensity iso-contours in the reactor of FIG. 1 for a quench gas flow rate of 375 slpm.

Turbulence intensity iso-contours for these conditions are given in FIGS. 10 and 11 for quench gas flow rate of 225 and 375 slpm respectively.

Figure 12:
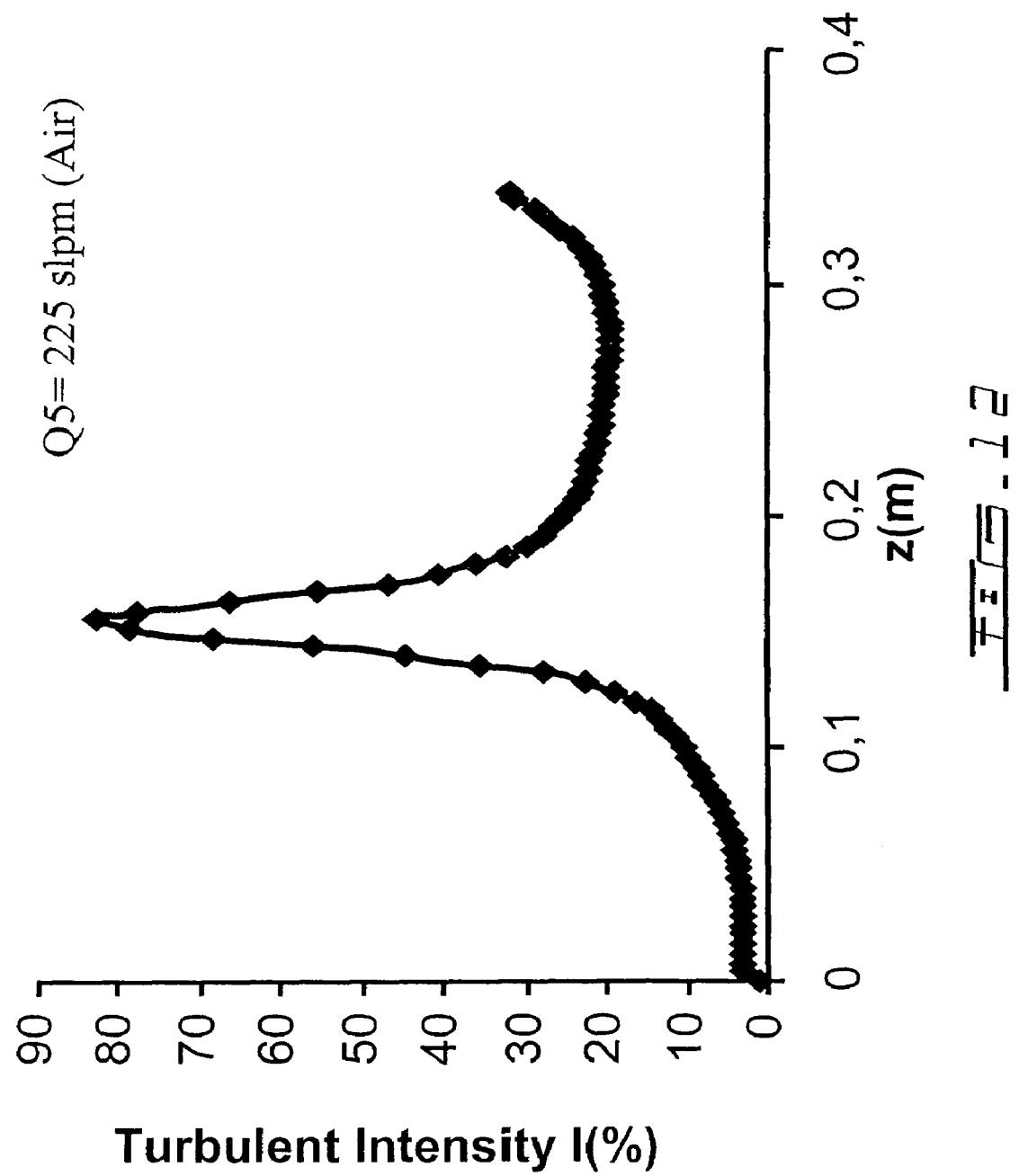
FIG. 12 is a graph illustrating the turbulence intensity longitudinal distribution along the centerline of the reactor of FIG. 1 for a gas flow rate in the quench zone of 225 slpm.
Figure 15:
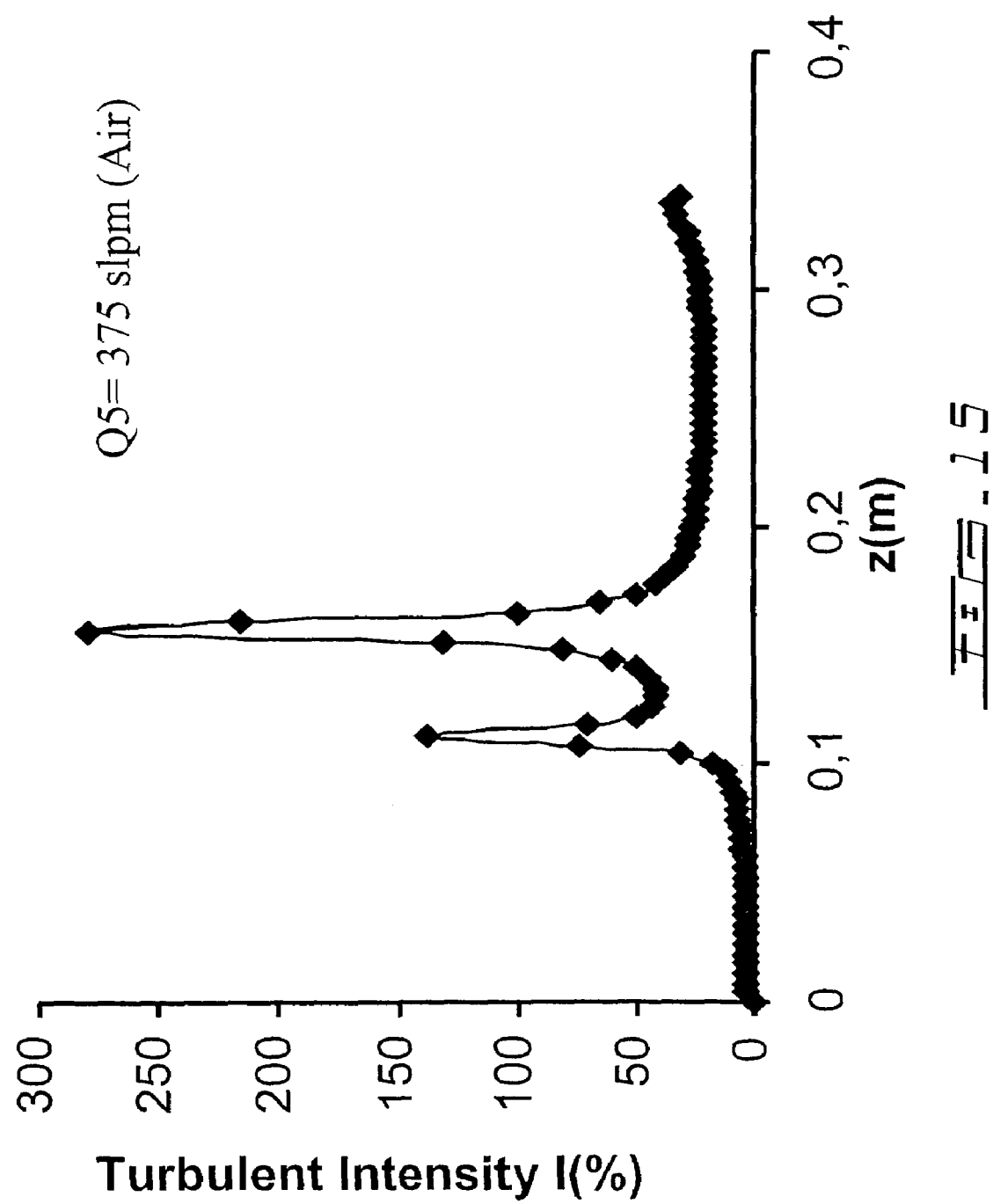
FIG. 15 is a graph illustrating the turbulence intensity longitudinal distribution along the centerline of the reactor of FIG. 1 for a gas flow rate in the quench zone of 375 slpm.

Actual turbulent intensity profiles along the center line of the reactor 2 and the corresponding reaction products cooling rates are given in FIGS. 12 and 15 for quench gas flow rates of 225 and 375 slpm (Air) respectively. These Figures show turbulence intensity levels as high as 80% and 270% in the quench zone which is significantly higher than any turbulence values in known reactor configurations.

Figure 13:
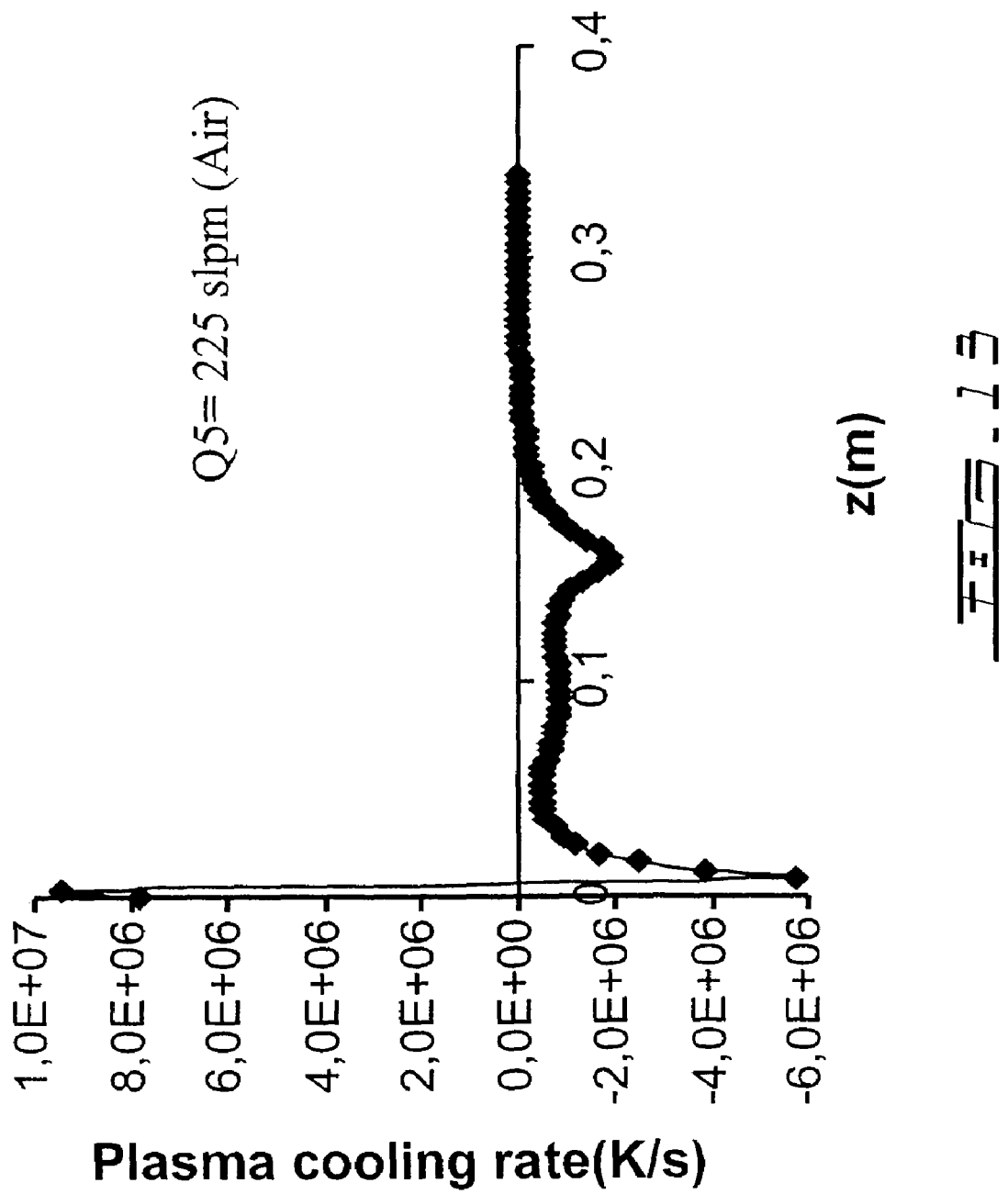
FIG. 13 is a graph illustrating the cooling rate longitudinal distribution along the centerline of the reactor of FIG. 1 for a gas flow rate in the quench zone of 225 slpm.
Figure 14:
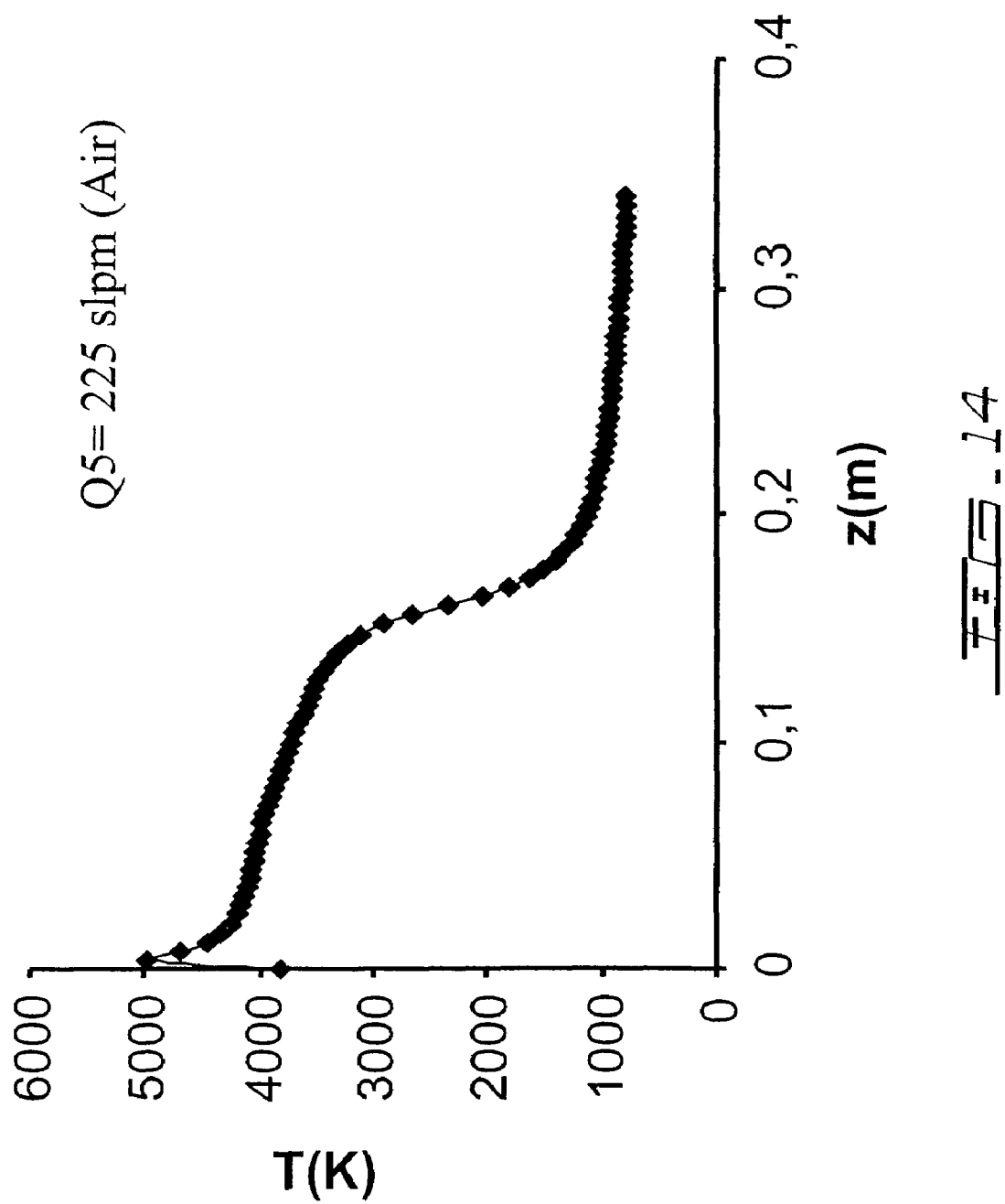
FIG. 14 is a graph illustrating the axial temperature profile along the centerline of the reactor of FIG. 1 for a gas flow rate in the quench zone of 225 slpm.
Figure 16:
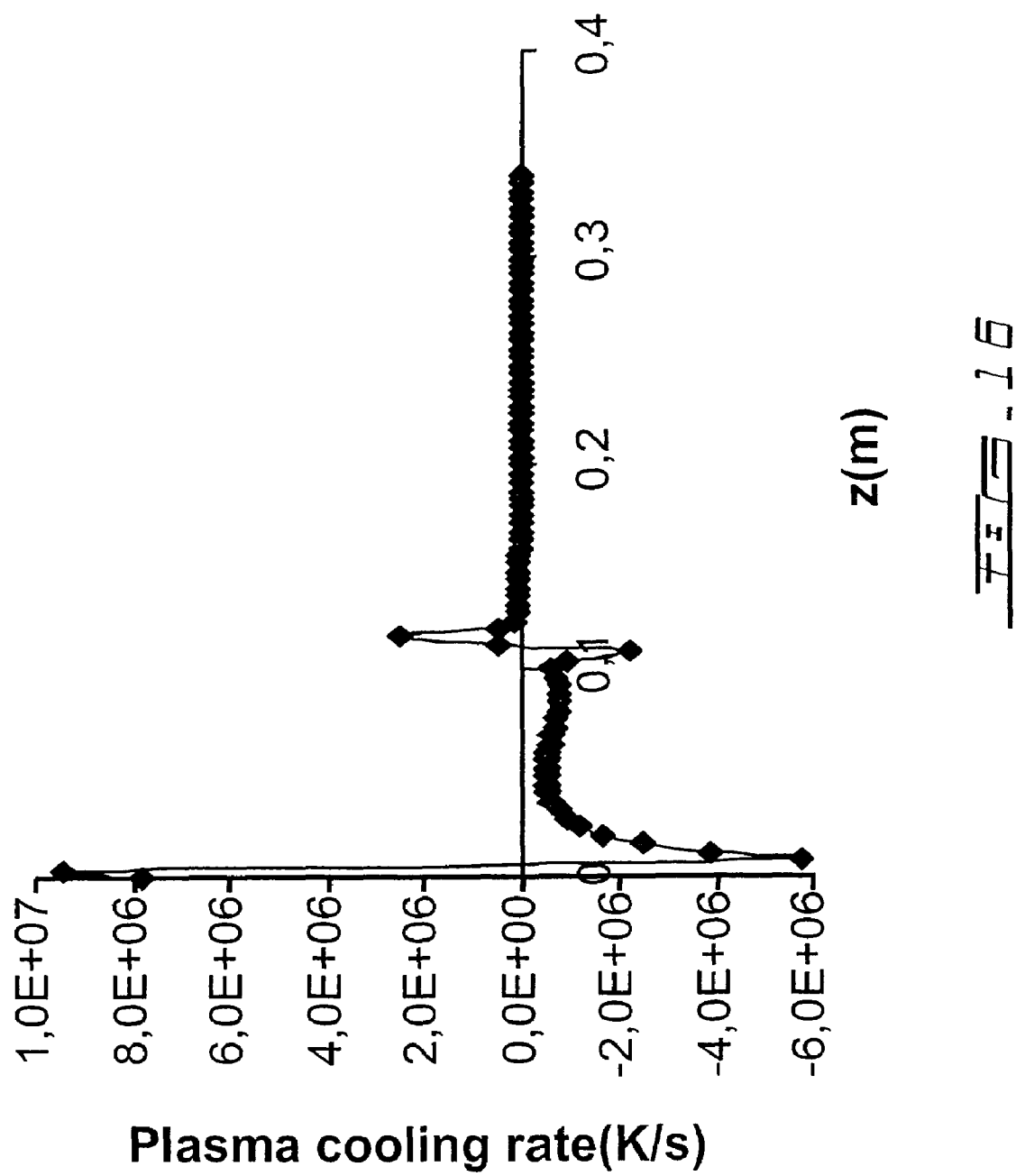
FIG. 16 is a graph illustrating the cooling rate longitudinal distribution along the centerline of the reactor of FIG. 1 for a gas flow rate in the quench zone of 375 slpm.
Figure 17:
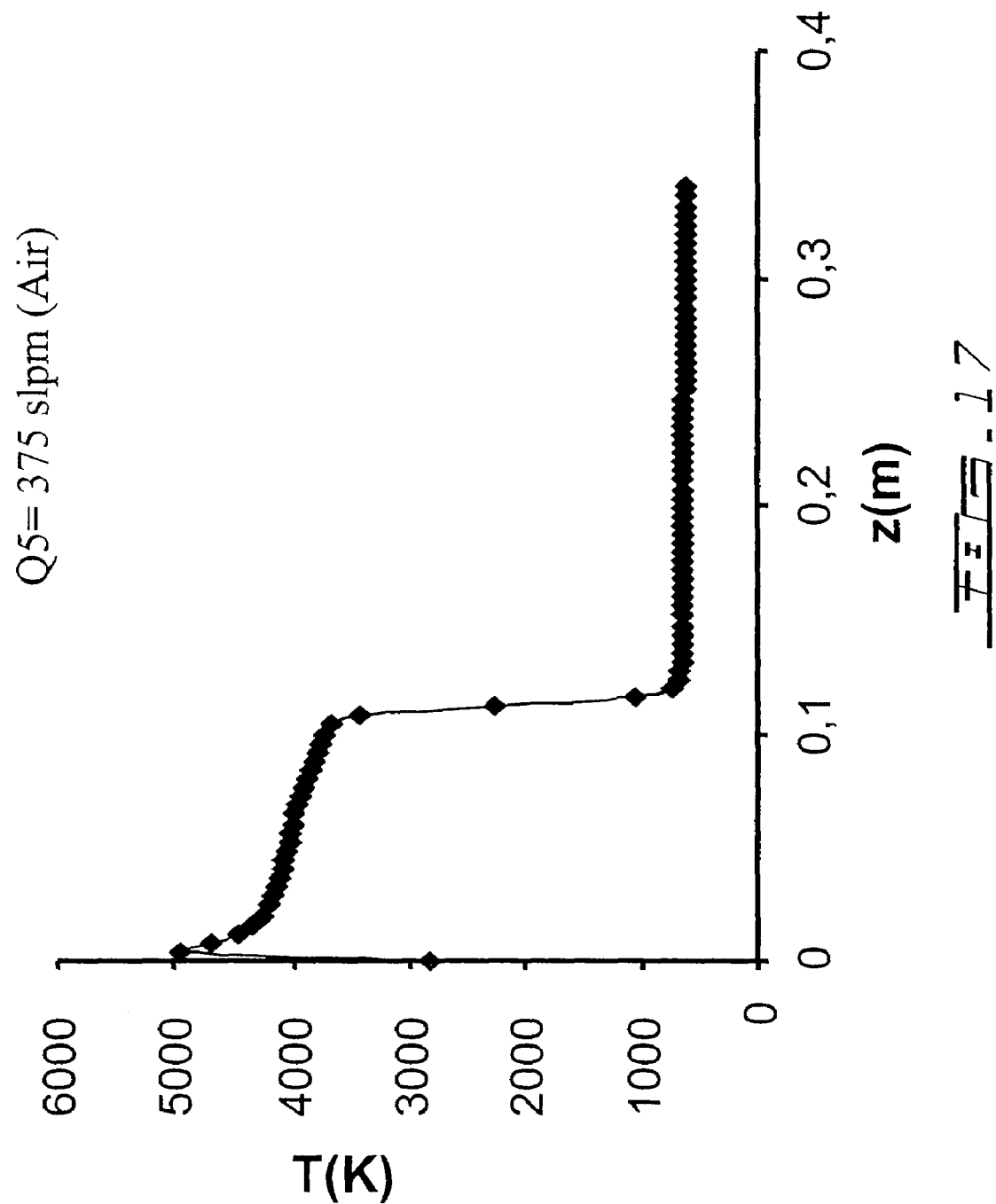
FIG. 17 is a graph illustrating the axial temperature profile along the centerline of the reactor of FIG. 1 for a gas flow rate in the quench zone of 375 slpm.

FIGS. 13 and 16 show reaction product cooling rates achieved using high intensity quench technique from the illustrative embodiments as high as $6 \times 10^6$ K/s which plays a key role in the formation of the nanopowders. These two Figures also show how an increase in turbulence in the quench zone results in the increase in the plasma cooling rate. By comparing FIGS. 14 and 17, which illustrates the temperature profile in the reactor 2 for quench gas flow rate of 225 and 375 slpm respectively, one can also see the positive impact of the increase in turbulence in the quench zone on the cooling rate.

It is to be noted that a production capacity of a 30 kW induction plasma installation, which is in the hundreds of grams per minute (above 100 g/min) of titanium dioxide nanopowder, can be achieved using a process according to the present invention, compared to that of a few grams per minute associated with known direct current/supersonic quench process.

Through experimentation, the production rate of $TiO_2$ nanopowder of near 150 g/min was achieved, which is significantly higher than what can be achieved using known techniques. The corresponding BET (Bruaner Emett and Teller) specific area analysis for the produced nanopowder showed 34.7 $m^2$/g, with a corresponding mean particle diameter of 43.3 nm. X-ray diffraction (XRD) analysis of the produced powder showed that it is constituted of 84% wt of the anatase phase.

Although the present invention has been described by way of reference to the synthesis of titanium dioxide nanopowder by heating titanium tetrachloride, the present invention can be used to manufacture other metal oxide nanopowder such as Zinc oxide or Zirconium oxide.

Although the present invention has been described hereinabove by way of an illustrative embodiment thereof, this embodiment can be modified at will, within the scope of the appended claims, without departing from the spirit and nature of the subject invention.

What is claimed is:

1. An apparatus for synthesizing a metal oxide nanopowder from a metal compound vapour, comprising:
   a reaction chamber including a vertically disposed generally tubular chamber section and a taper chamber section mounted at a lower end of said vertically disposed generally tubular chamber section for collecting synthesized metal oxide nanopowder;
   an induction plasma assembly including a reactant mixing chamber mounted to an upper end of said vertically disposed generally tubular chamber section so as to be in fluid communication with said reaction chamber; said induction plasma assembly further including an inductive coil surrounding said reactant mixing chamber for generating a high frequency magnetic field in said reactant mixing chamber, a first inlet for receiving a first working gas and a second inlet for receiving the metal compound vapour; said first and second inlet being connected to said generally tubular reactant mixing chamber; and
   a plurality of quench gas nozzles connected to the periphery of said vertically disposed generally tubular chamber section below the upper end thereof for creating a highly turbulent gas quench zone in said reaction chamber wherein each of said plurality of quench gas nozzles are oriented at the same angle relative to a normal to said periphery of said vertically disposed generally tubular chamber section and wherein said plurality of quench gas nozzles are so connected to said vertically disposed generally tubular chamber section so that said angle is adjustable;
   whereby, in operation, an induction plasma jet is created by passing a working gas through said high frequency electromagnetic field in said reactant mixing chamber; said induction plasma jet and the metal compound vapour being introduced in said reaction chamber; said plasma jet causing the metal compound vapour to reach a reaction temperature and to react with said working gas, yielding nanosized metal oxide particles; said nanosized metal oxide particles being rapidly cooled in said highly turbulent gas quench zone of said reactor, thereby stopping the growth process of said nanosized metal oxide particles, yielding metal oxide nanopowder.

2. An apparatus as recited in claim 1, wherein said plurality of quench gas nozzles are substantially coplanar.

3. An apparatus as recited in claim 1, wherein said plurality of quench gas nozzles are located below said upper end at a distance ranging from about 5 centimeters to about 30 centimeters.

4. An apparatus as recited in claim 1, wherein said induction plasma assembly further comprises a third inlet to receive a second working gas.

5. An apparatus as recited in claim 1, wherein said reactant mixing chamber is generally tubular.

6. An apparatus as recited in claim 5, wherein said second inlet is so connected to said reactant mixing chamber so as to allow coaxial introduction of said metal compound vapour within said reactant mixing chamber.

7. An apparatus as recited in claim 5, wherein said second inlet is so connected to said reactant mixing chamber so as to allow radial introduction of said metal compound vapour within said reactant mixing chamber.

8. An apparatus as recited in claim 1, wherein said plurality of quench gas nozzles are so connected to the periphery of said vertically disposed tubular chamber section as to be equally spaced.

9. An apparatus as recited in claim 1, further comprising a filter unit mounted to a lower end of said taper chamber section via a conduit, for capturing synthesized metal oxide nanopowder received from said generally tubular chamber section and for removing exhaust gases from said reaction chamber.

10. An apparatus as recited in claim 9, further comprising a fourth inlet connected to said conduit for introducing in said conduit a doping agent suitable for coating said metal oxide nanopowder.

* * * * *